March 5, 1963 J. H. McCARTHY, JR 3,080,118
WATER HEATER AND METHOD OF HEATING WATER
Filed Sept. 6, 1960
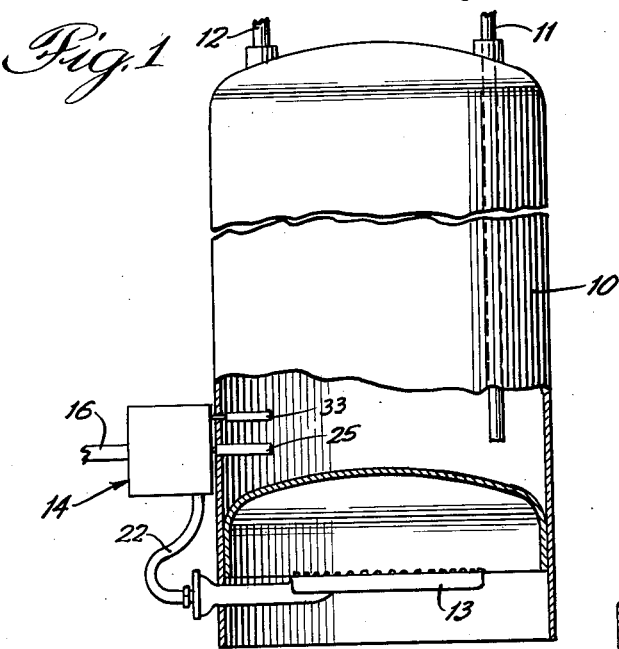
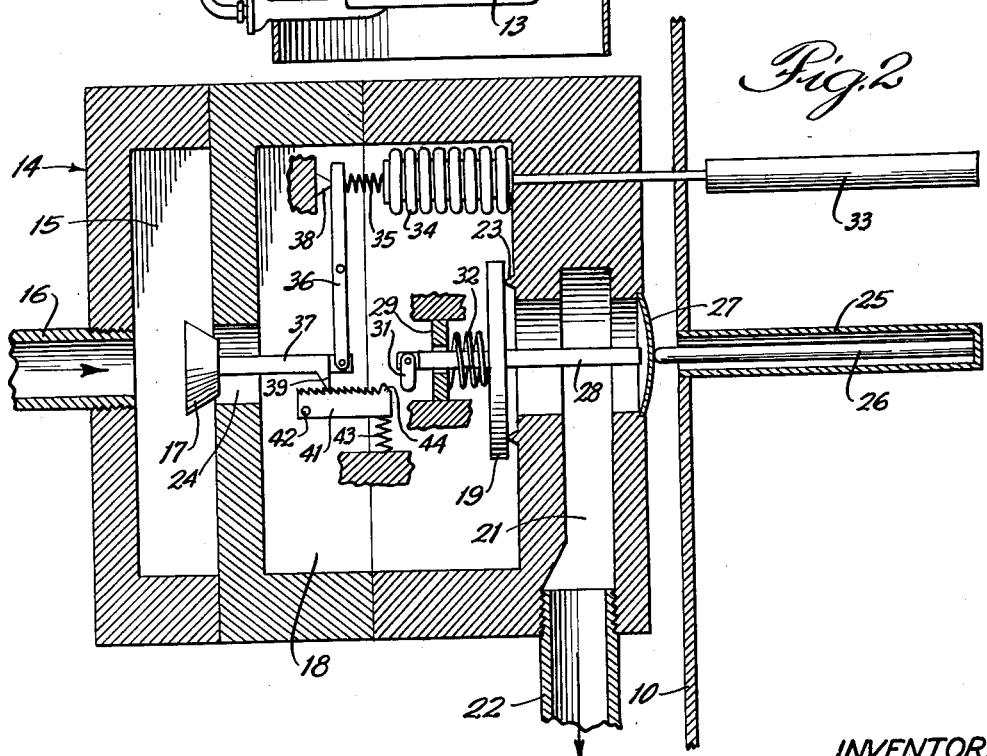
INVENTOR:
Joseph H. McCarthy Jr.
BY
ATTORNEYS.

3,080,118
WATER HEATER AND METHOD OF HEATING WATER
Joseph H. McCarthy, Jr., Western Springs, Ill., assignor to Rheem Manufacturing Company, Chicago, Ill., a corporation of California
Filed Sept. 6, 1960, Ser. No. 54,026
13 Claims. (Cl. 236—32)

This invention relates to a water heater and a method of heating water, and more particularly to the heating of water for domestic use. In automatic water heaters of the type used domestically and in light industrial installations it has been common to provide a thermostatic control to start the heating means such as a fluid fuel burner when the water temperature falls to a predetermined minimum and to stop the heating means when the water temperature rises to a predetermined maximum. If the heating means is set at a high rate, the efficiency is low particularly when the water temperature is only a few degrees below the desired temperature. On the other hand, if the heating means is set at a low rate an extremely large storage tank is required to store sufficient hot water to meet the peak demands.

It has been recognized that a variable rate heating means would be desirable to produce a high heating rate when the demand is high and a low heating rate when the demand is low. However, variable rate controls as heretofore known have been too expensive and complicated for normal domestic use. Furthermore, a control directly proportionately responsive to the demand is not entirely satisfactory since the heating rate becomes too low for practical efficiency when the temperature approaches the shut off point.

It is accordingly one of the objects of the present invention to provide a water heater and a method of heating in which the heating rate is varied in proportion to the demand and is maintained at the maximum rate achieved by it during each heating cycle until the heating cycle is terminated.

Another object is to provide a water heater and a method of heating in which the heating operation is initiated when the water temperature drops to a predetermined minimum and is terminated when the water temperature reaches a predetermined maximum, and in which the heating rate is adjusted in proportion to the water temperature during a heating operation and is maintained during the heating operation at the maximum rate to which it is adjusted until the heating operation is terminated.

In one desirable construction for carrying out the invention separate temperature responsive controls are employed, one of which starts and stops the heating means and the other of which adjusts the heating rate with the first-named control functioning to reset the heating rate to a minimum at the beginning of each heating cycle.

The above and other objects and features of the invention will be more readily apparent from the accompanying description when read in connection with the accompanying drawing, in which:

FIGURE 1 is a side elevation with parts broken away and in section of a water heater embodying the invention, and FIGURE 2 is an enlarged sectional view with parts in elevation of the control shown in FIGURE 1.

The water heater as shown in FIGURE 1 comprises a storage tank 10 for storing hot water and which may be of conventional construction. Cold water to be heated is supplied to the lower part of the tank through an inlet conduit 11 and heated water for use is drawn off from the top part of the tank through a connection 12. The water in the tank may be heated by any desirable type of heating means shown as a gas burner 13 mounted beneath the bottom of the tank and supplied with fuel through a control indicated generally at 14. It will be understood that when a gas burner is employed, the usual pilot (not shown) is provided so that the burner will light to heat the water in the tank whenever gas is supplied thereto through the control.

The control, as best seen in FIGURE 2, comprises a pair of temperature sensing devices responsive to the temperature of the water in the tank near the lower portion thereof. It has been found that by sensing the water temperature at one point in the tank, an approximate indication of the demand is obtained since the temperature will decrease in approximate proportion to the amount of heated water drawn off from the tank, which is in turn proportional to the amount of cold water supplied to the tank. For example, if only one or two gallons of heated water are drawn off from the tank, the temperature in the lower part thereof will be reduced only a few degrees while if a larger quantity of water is drawn off, the temperature will eventually tend to reach the temperature of the incoming water which is substantially below the desired temperature for the heated water. Thus, the temperature of the water in the lower part of the tank gives an indication approximating the demand and which is utilized to adjust the heating rate according to the invention.

The control unit 14 as shown in detail in FIGURE 2 comprises a hollow body defining an inlet chamber 15 to which gas or similar fluid fuel is supplied through a pipe 16. A throttling valve 17 controls communication between the inlet chamber 15 and an intermediate chamber 18. An on-off valve 19 controls the flow of fuel from the chamber 18 through a discharge passage 21 which is connected by a pipe 22 to the burner 13. The valve 19 is preferably a poppet type disc valve as shown which seats against an annular seating surface 23 to cut off the flow of fuel and which is moved away from the seating surface to open the passage for fuel flow. The valve 17 is preferably in the form of a tapered plug movable more or less into an opening 24 variably to throttle the flow of fuel through the opening.

The on-off valve 19 is controlled by a temperature responsive element comprising an outer tube 25 and an inner rod 26 projecting through the wall of the tank 10 into the water therein. The tube 25 and the rod 26 are formed of metals having different coefficients of thermal expansion so that when the water is heated they will occupy approximately the relationship shown in FIGURE 2. When the water is cooled the tube 25 will shrink to a greater degree than the rod 26 to move the free end of the rod 26 to the left. The free end of the rod 26 engages a snap washer 27 which normally occupies the position shown but which snaps rapidly to the left when it is pushed beyond center by the rod 26. This provides a rapid snap action for the valve 19 so that it will be either fully opened or fully closed at all times with no fluttering or hunting.

The valve 19 carries a rod 28, one end of which is adapted to be engaged by the disc 27 to open the valve and the other end of which extends slidably through an opening in a fixed disc 29. The other end of rod 28 is connected through a shoulder as shown to a reduced tip which carries a pivoted pawl element 31. The pawl 31 is free to pivot clockwise but is prevented by the shoulder from pivoting counterclockwise. Preferably, a spring 32 acts between the fixed disc 29 and the valve 19 to urge the valve against its seat and to hold it securely closed when it is in its closed position.

The valve 17 is adjusted in proportion to the temperature of the water in the tank to provide a variable heating rate proportional to the temperature. For this purpose a bulb 33 projects into the tank adjacent to the temperature sensing unit 25, 26 and is connected to a flexible bellows 34 in the control unit. The bulb and bellows contain an expansible fluid whose volume increases with increase in temperature to effect adjustment of the valve. The free end of the bellows 34 is connected through a double acting spring 35 to one end of a lever 36 which is pivoted intermediate its ends in the control unit housing and whose lower end is connected directly through stem 37 to the valve 17. A fixed stop 38 limits movement of the lever 36 in a counterclockwise direction and predetermines the minimum opening of the valve 17.

In order to hold the valve 17 to the maximum open position achieved by it during a heating cycle, a pawl 39 is provided on the inner end of the valve stem 37 to engage a ratchet 41. The ratchet 41 is pivoted at one end at 42 and its opposite end is urged upwardly so that it will engage the pawl 39 by spring 43. At its free end the ratchet 41 carries a cam projection 44 which is engaged by the cam pawl 31 when it moves to the left during opening of the valve 19 to cam the ratchet 41 away from the pawl 39 and allow the valve 17 to move to the right to its minimum open position.

In operation let it be assumed that the water in the tank is to be maintained at a temperature of 150° F. and that a heating cycle will be initiated when the temperature of the water in the lower part of the tank drops to a minimum of 140° F. Assuming that water is drawn from the tank and cold water is admitted to the lower portion thereof, when sufficient cold water has been admitted to reduce the temperature to 140° F., the rod 26 will snap the disc 27 to the left to open the valve 19 to its full open position and start the supply of fuel to the burner 13. As the valve 19 travels to the left, the pawl 31 will engage the cam projection 44 and move the ratchet 41 downward away from the pawl 39. After the pawl 31 passes over the cam projection 44 the ratchet 41 will be raised to engage the pawl 39. At this time, since the water surrounding the bulb 33 is at a temperature of at least 140° the spring 35 will move the lever 36 against the stop 38 and thereby move the valve 17 to its minimum open position as shown to start the burner at its minimum heating rate. If no further water is withdrawn from the the tank the burner will remain in operation at its minimum rate until the temperature of the water has again reached 150° F., at which time the rod 26 will be retracted sufficiently to permit the disc 27 to snap back to the right so that the valve 19 will close.

If additional water is withdrawn from the tank so that additional cold water is supplied thereto to drop the temperature below 140° F., the bellows 34 will contract and through the spring 35 will turn the lever 36 clockwise to shift the valve 17 to the left, thereby to increase the fuel supply and the heating rate. In a typical adjustment, the valve 17 would be moved toward its open position to increase the heating rate to the maximum in which the valve 17 is fully opened when the water temperature reaches approximately 100° F. In any case, as the valve 17 moves to the left the pawl 39 thereon will cooperate with the ratchet 41 to hold it in the maximum open position it achieves during a heating cycle. When the temperature is brought back up to 150° F., the valve 19 will close with the pawl 31 pivoting freely over the cam projection 44 to leave the valve 17 in the position then occupied by it. The parts will remain in this condition until the water temperature again drops sufficiently to open the valve 19 which will, during its opening movement, cam the ratchet 41 downward to release the valve 17 and permit it to return to its minimum open position at the start of the heating operation.

While one embodiment of the invention has been shown and described in detail, it will be understood that this is illustrative only and is not to be taken as a definition of the scope of the invention, reference being had for this purpose to the appended claims.

What is claimed is:

1. A water heater comprising a tank to contain heated water, heating means for heating the water in the tank, first control means responsive to the temperature of the water in the tank to initiate operation of the heating means when the temperature is below a predetermined minimum value and to stop operation of the heating means when the temperature reaches a predetermined maximum value, second control means responsive to the temperature of the water in the tank to vary the rate of operation of the heating means when the water temperature is below said predetermined minimum value, and means cooperating with the control means to maintain the heating rate at the maximum to which it is adjusted while the heating means is operating and to return the heating rate to minimum each time operation of the heating means is initiated.

2. A water heater comprising a tank to contain heated water, heating means for heating the water in the tank, first control means responsive to the temperature of the water in the tank to initiate operation of the heating means when the temperature is below a predetermined minimum value and to stop operation of the heating means when the temperature reaches a predetermined maximum value, second control means responsive to the temperature of the water in the tank to vary the rate of operation of the heating means when the water temperature is below said predetermined minimum values, latch means cooperating with the second control means to maintain the heating rate at the maximum to which it is adjusted while the heating means is operating, and means operated by the first control means to release the latch means and allow the heating rate to return to minimum each time the first control means operates through an off-on cycle.

3. A water heater comprising a tank to contain heated water, a fluid fuel burner to heat the water in the tank, an on-off valve to control the supply of fluid fuel to the burner, first thermostatic means responsive to the temperature of the water in the tank to control opening and closing of the valve, a throttling valve in series with the on-off valve to vary the rate of supply of fuel to the burner when the on-off valve is open, second thermostatic means responsive to the temperature of the water in the tank to adjust the throttling valve, latch means to hold the throttling valve in the maximum open position it achieves when the on-off valve is open, and means operated by the first thermostatic means when it operates through an off-on cycle to release the latch means and allow the throttling valve to return to its minimum open position.

4. The water heater of claim 3 in which the thermostatic means comprise temperature responsive elements mounted adjacent to each other in the lower part of the tank.

5. A water heater comprising a tank to contain heated water, a fluid fuel burner to heat the water in the tank, an on-off valve to control the supply of fluid fuel to the burner, first thermostatic means responsive to the temperature of the water in the tank to control opening and closing of the valve, a throttling valve in series with the on-off valve to vary the rate of supply of fuel to the burner when the on-off valve is open, second thermostatic means responsive to the temperature of the water in the tank to adjust the throttling valve, a ratchet to hold the throttling valve in the maximum open position it achieves when the on-off valve is open, and cam means operated by movement of the on-off valve from its closed to its open position to disengage the ratchet so that the throttling valve can move to its minimum open position.

6. A water heater comprising a tank to contain heated water, a fluid fuel burner to heat the water in the tank, an on-off valve to control the supply of fluid fuel to the burner, first termostatic means responsive to the temperature of the water in the tank to control opening and closing of the valve, a throttling valve in series with the on-off valve to vary the rate of supply of fuel to the burner when the on-off valve is open, second thermostatic means responsive to the temperature of the water in the tank to adjust the throttling valve, an elongated ratchet bar pivoted at one end, a pawl connected to the throttling valve and engageable with the ratchet bar to hold the throttling valve in the maximum open position to which it is moved, and cam means operated by the on-off valve when it moves in one direction between its closed and open positions to move the ratchet bar out of engagement with the pawl and allow the throttling valve to move to its minimum open position.

7. A water heater comprising a tank to contain heated water, heating means for heating the water in the tank, and control means responsive to the temperature of the water in the tank to control the heating means, the control means including means to initiate operation of the heating means when the water temperature reaches a predetermined minimum value, and to stop operation of the heating means when the temperature reaches a predetermined maximum value, means to adjust the rate of operation of the heating means proportionally to the water temperature when it is below said predetermined minimum value, means to maintain the heating rate at the maximum to which it is adjusted while the heating means is in operation, and means to reduce the heating rate to a minimum each time operation of the heating means is stopped and re-initiated.

8. The method of heating a body of water which comprises initiating a heating cycle for the water each time its temperature drops below a predetermined minimum and terminating the heating cycle each time said temperature rises to a predetermined maximum, increasing the rate of heat supply during a cycle proportionally to the amount the water temperature falls below said minimum, maintaining the rate of heat supply at the maximum to which it is adjusted during each cycle to termination of the cycle, and resetting the rate of heat supply to a minimum upon initiation of each cycle.

9. Control means for a heating device comprising means responsive to the temperature of a medium heated by the heating device to initiate operation of the heating device when the medium is below a predetermined temperature and to stop operation of the heating device when the medium is above a predetermined maximum temperature, means responsive to the temperature of the medium when it is below said predetermined temperature to vary the rate of operation of the heating means proportionally to the temperature, means to maintain the rate of operation of the heating means at the maximum to which it is varied during its operation, and means to reduce the rate of operation to a minimum each time operation of the heating device is stopped and restarted.

10. Control means for a fluid fuel burner comprising valve means to control the supply of fuel to the burner, means responsive to the temperature of a medium heated by the burner to open the valve means to supply fuel to the burner when the medium is below a predetermined minimum temperature, means responsive to the temperature of the medium when it is below said predetermined temperature to adjust the valve means to vary the rate of fuel supply proportionally to the temperature, latch means to hold the valve means in the maximum open position to which it is adjusted during each operating cycle, and means operated by the first named temperature responsive means to release the latch means each time the temperature rises above the predetermined maximum and falls below said predetermined temperature to close and reopen the valve means whereby operation of the burner will be initiated at a minimum rate.

11. Control means for a fluid fuel burner comprising a shut off valve controlling supply of fuel to the burner, a throttling valve in series with the shut off valve for varying the rate of fuel supply when the shut off valve is open, means responsive to the temperature of a medium heated by the burner to open the shut off valve when the temperature is below a predetermined minimum and close it when the temperature is above a predetermined maximum, means responsive to the temperature of the medium when it is below said predetermined temperature variably to open the throttling valve in inverse proportion to the temperature, a latch to hold the throttling valve in its maximum open position, and means operated by the shut off valve to release the latch each time the shut off valve is closed and opened.

12. The method of heating a medium which comprises initiating the supply of heat to the medium each time its temperature drops below a predetermined minimum and terminating the supply of heat each time the temperature rises above a predetermined maximum, increasing the rate of heat supply proportionally to the amount the temperature falls below said minimum, maintaining said rate at the maximum to which it is adjusted while supply of heat continues, and resetting the rate of supply to heat to a minimum upon each initiation of the supply of heat.

13. A water heater comprising a tank to contain heated water, a fluid fuel burner to heat the water in the tank, a fuel supply conduit to supply fuel to the burner, an on-off valve in the conduit, a second valve in series with the on-off valve in the conduit and movable between two extreme positions in one of which it restricts the flow of fuel to a minimum rate and in the other of which it is at maximum opening to provide for flow of fuel at a maximum rate when the on-off valve is open, first thermostatic means responsive to the temperature of water in the tank, operating means for the on-off valve responsive to the first thermostatic means to open and close the on-off valve with a snap action as the water temperature changes below and above predetermined limits, a second thermostatic means responsive to the temperature of water in the tank, and means separate from said operating means connecting the second thermostatic means to the second valve to move it from said one position to said other position when the water temperature is below said predetermined limits and said on-off valve is open, and means controlled by one of said thermostatic means for returning the second valve to said one position each time the on-off valve is closed and re-opened so that the burner is always started with fuel flow thereto at a minimum rate.

References Cited in the file of this patent

UNITED STATES PATENTS

| | | |
|---|---|---|
| 2,169,284 | Ploeger | Aug. 15, 1939 |
| 2,263,103 | Rathburn | Nov. 18, 1941 |
| 2,783,946 | Lansky et al. | Mar. 5, 1957 |
| 2,831,504 | Coffey | Apr. 22, 1958 |
| 2,913,182 | Bryce et al. | Nov. 17, 1959 |
| 2,919,858 | Matthews | Jan. 5, 1960 |
| 2,924,387 | Hajny | Feb. 9, 1960 |